(12) United States Patent
Shiraki et al.

(10) Patent No.: US 8,820,448 B2
(45) Date of Patent: Sep. 2, 2014

(54) IN-WHEEL MOTOR AND ELECTRICALLY DRIVEN VEHICLE

(75) Inventors: Manabu Shiraki, Kanagawa (JP); Akira Kitajima, Kanagawa (JP)

(73) Assignee: M-Link Co., Ltd., Kanagawa (JP)

( * ) Notice: Subject to any disclaimer, the term of this patent is extended or adjusted under 35 U.S.C. 154(b) by 372 days.

(21) Appl. No.: 13/174,583

(22) Filed: Jun. 30, 2011

(65) Prior Publication Data
US 2012/0001521 A1    Jan. 5, 2012

(30) Foreign Application Priority Data
Jul. 2, 2010    (JP) .................................. 2010-152109

(51) Int. Cl.
*B60K 1/00* (2006.01)
*B60K 7/00* (2006.01)
*H02K 7/102* (2006.01)

(52) U.S. Cl.
USPC .................. 180/65.51; 180/65.6; 180/65.1

(58) Field of Classification Search
USPC ............... 180/65.51, 65.1, 65, 65.6; 310/77
See application file for complete search history.

(56) References Cited

U.S. PATENT DOCUMENTS

| | | | | |
|---|---|---|---|---|
| 3,993,920 A | * | 11/1976 | Sato | 310/66 |
| 7,735,588 B2 | | 6/2010 | Murata | |
| 2005/0127767 A1 | * | 6/2005 | Gallant | 310/113 |
| 2006/0272871 A1 | * | 12/2006 | Murata | 180/65.5 |
| 2007/0257570 A1 | * | 11/2007 | Walter et al. | 310/67 R |

FOREIGN PATENT DOCUMENTS

JP    H11-262101    9/1999

* cited by examiner

*Primary Examiner* — Hau Phan
*Assistant Examiner* — Bryan Evans
(74) *Attorney, Agent, or Firm* — SoCal IP Law Group LLP; Steven C. Sereboff; John E. Gunther

(57) ABSTRACT

The in-wheel motor of the present invention includes: a cylindrical coil body; a coil body support member fixed to a shaft; an outer yoke that is disposed on an outer circumferential side of the coil body, and is fixed to a wheel disk; a magnet fixed on an inner circumferential face of the outer yoke; an inner yoke that is disposed on an inner circumferential side of the coil body, and is disposed to face the coil body. The outer yoke and the inner yoke are fixed, and are rotatable around the shaft; and a caliper is provided on an inner circumferential side of the inner yoke.

5 Claims, 3 Drawing Sheets

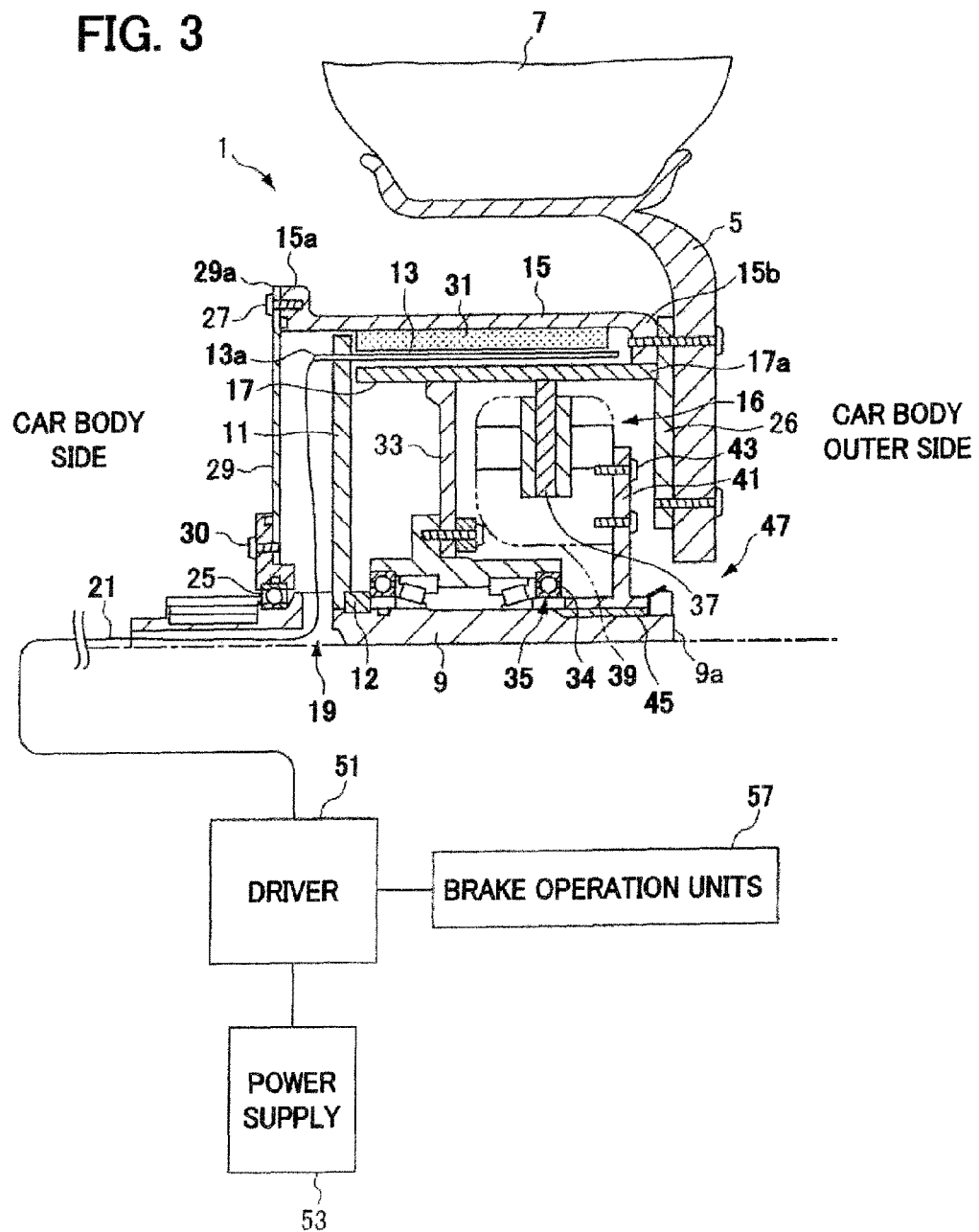

IN-WHEEL MOTOR AND ELECTRICALLY DRIVEN VEHICLE

This application is based on and claims the benefit of priority from Japanese Patent Application No. 2010-152109, filed on 2 Jul. 2010, the content of which is incorporated herein by reference.

BACKGROUND OF THE INVENTION

1. Field of the Invention

The present invention relates to an in-wheel motor that drives a wheel by a motor provided inside a wheel disk of the wheel, and particularly relates to an electrically driven vehicle such as an electric car, a hybrid car and a power-assisted bicycle.

2. Related Art

Patent Document 1 (Japanese Unexamined Patent Application, Publication No. H11-262101) discloses that an iron core and a coil wound around the iron core are provided on an inner circumferential face of an outer yoke (a motor container) that is fixed to a shaft, a magnet facing the iron core is rotatably provided to the shaft, and a current is applied to the coil, thereby rotationally driving a wheel disk together with the shaft. The technique of Patent Document 1 discloses that the brake disk is fixed to the shaft between the wheel disk and the outer yoke.

Patent Document 2 (U.S. Pat. No. 7,735,588 B2) discloses an invention including: an outer yoke fixed to a wheel disk; and an inner yoke being rotatable relative to the outer yoke, in which an iron core and a coil wound around the iron core are fixed to the inner yoke, a magnet facing the iron core is fixed to the outer yoke, and an electric current is applied to the coil, thereby rotationally driving the wheel disk together with the outer yoke. In addition, Patent Document 2 discloses that a base of a brake disk support is fixed to the wheel disk via a hub, a tip of the brake disk support is disposed inside the inner yoke, the brake disk is fixed to the tip of the brake disk support, and the brake disk and a caliper are provided on an inner circumferential side of the inner yoke.

SUMMARY OF THE INVENTION

However, in Patent Document 1, since the brake disk is provided between the outer yoke and the wheel disk, space for the brake mechanisms (such as the brake disk and the caliper) are required inside the wheel disk in addition to the space for the motor mechanism; therefore, there is a problem that restriction is imposed on the space for the motor mechanism.

In Patent Document 2, a brake mechanism is provided on an inner circumferential side of an inner yoke, but a base of a brake disk support is fixed to a wheel disk via a hub, and a tip thereof is disposed on the inner yoke to fix the brake disk; therefore, there is a problem that the configuration is complicated.

Moreover, in Patent Document 2, the brake mechanism is disposed on the inner circumferential side of the motor mechanism inside the wheel disk, but the motor mechanism and the brake mechanism are separately configured; therefore, there is a problem that restriction is imposed on the space for the motor mechanism.

Furthermore, both Patent Documents 1 and 2 disclose a motor of a core type in which a coil is wound around an iron core; therefore, there is a problem that the weight is increased.

Accordingly, an object of the present invention is to provide an in-wheel motor and an electrically driven vehicle being lightweight, with a brake mechanism, without imposing any restriction on space for installing a motor mechanism.

In order to achieve such an object, a first aspect of the present invention is to provide an in-wheel motor installed inside a wheel disk of a wheel to rotationally drive the wheel around a shaft of the wheel by way of applying a current thereto, and the in-wheel motor includes: a cylindrical coil body to which a lead wire for applying a current is connected, the shaft being inserted in an inner circumferential side of the coil body; a coil body support member that is fixed to the shaft to support the coil body; a cylindrical outer yoke that is disposed on an outer circumferential side of the coil body, and is fixed to the wheel disk; a magnet that is fixed on an inner circumferential face of the outer yoke, and is disposed to face an outer circumferential face of the coil body; a cylindrical inner yoke that is disposed on the inner circumferential side of the coil body, and is disposed to face an inner circumferential face of the coil body, the inner yoke being fixed to the outer yoke and being rotatable around the shaft; a brake disk that is fixed to an inner circumferential side of the inner yoke; and a caliper that is provided on the inner circumferential side of the inner yoke to brake the brake disk.

According to the first aspect of the present invention, the motor mechanism installed inside the wheel disk is a motor mechanism of a so-called coreless type without an iron core; therefore, it is possible to provide an in-wheel motor that is more lightweight than a motor of a core type having an iron core such as those in Patent Documents 1 and 2.

It should be noted that the motor mechanism is configured with the coil body, the outer yoke, the inner yoke and the magnet; and the brake mechanism is configured with the brake disk and the caliper.

Since the brake mechanism is disposed inside the motor mechanism, the entire space inside the wheel disk can be utilized as the motor mechanism without imposing any restriction on the motor mechanism.

Since the brake disk support is directly fixed to the inner yoke as an operation member configuring the motor mechanism, a simple configuration can be achieved.

In the first aspect of the present invention, it is preferable that the outer yoke and the inner yoke together cover an outer circumferential side face, an inner circumferential side face, and one edge of the cylindrical coil body.

Since the outer yoke and the inner yoke cover the coil body, it is possible to prevent water and foreign matter from adhering thereto.

Moreover, in the first aspect of the present invention, it is preferable that the in-wheel motor further includes a caliper support disk, to which the caliper is mounted, and which is fixed to the shaft, in which a vent hole is formed in the wheel disk in a position facing an end portion of the shaft, the caliper support disk is disposed to face the vent hole of the wheel disk, and an outer diameter of the caliper support disk is larger than that of the vent hole of the wheel disk.

With such a configuration, by taking in air through the vent hole of the wheel disk, it is possible to cool the inside of the motor. The caliper support disk faces the vent hole, and the outer diameter thereof is larger than that of the vent hole; therefore, even in a case of taking in air from outside through the vent hole, it is possible to prevent water and foreign matter from invading the inside of the motor through the vent hole.

It is preferable that the in-wheel motor further includes a driver connected to the lead wire for applying a current to the coil body; and a power supply connected to the driver, in which the in-wheel motor works as a generator such that, in a driving mode, the driver supplies electricity from the power supply to the coil body and, in a braking mode, the driver supplies electricity from the coil body to the power supply.

When braking is applied to the wheel, the in-wheel motor works as a generator to convert the rotational energy into electricity, and as a result, the in-wheel motor can function as a regenerative brake.

A second aspect of the present invention is to provide an electrically driven vehicle that is equipped with the in-wheel motor according to the first aspect of the present invention. The electrically driven vehicle refers to an electric car, a hybrid car, a motorcycle, a power-assisted bicycle, a wheelchair, etc.

According to the second aspect of the present invention, it is possible to provide the electrically driven vehicle that achieves effects similar to those of the first aspect of the present invention.

BRIEF DESCRIPTION OF THE DRAWINGS

FIG. 3 is a vertical cross-sectional view showing an in-wheel motor according to a second embodiment of the present invention, which is cut into half along a shaft.

DETAILED DESCRIPTION OF THE INVENTION

Figure 1:
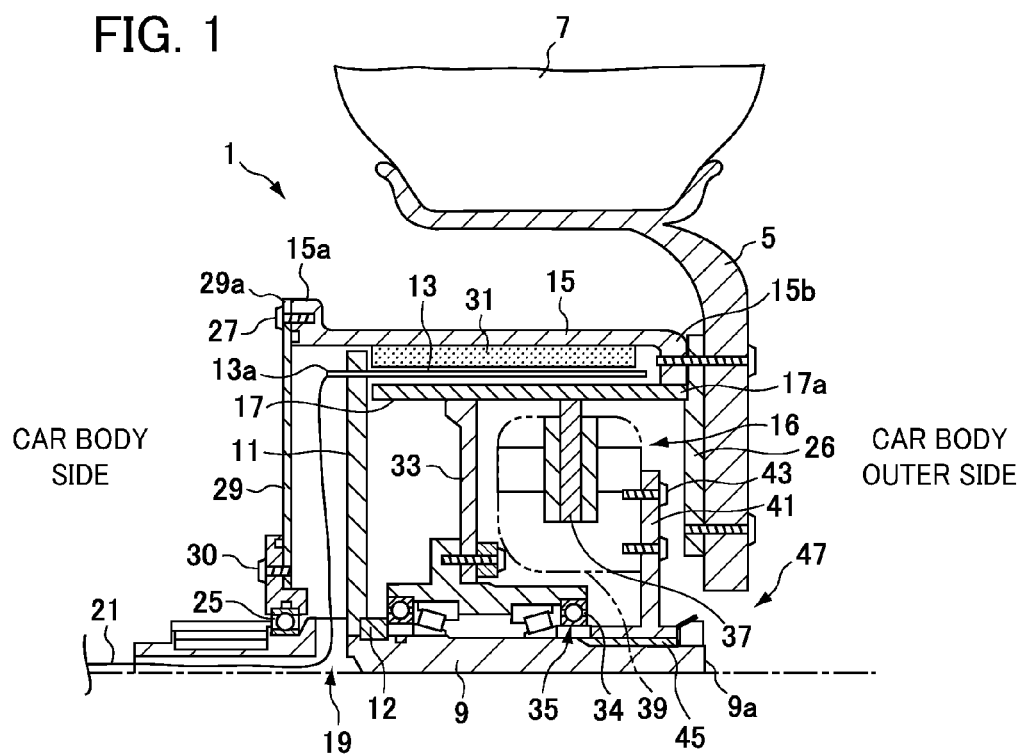
FIG. 1 is a vertical cross-sectional view showing an in-wheel motor according to a first embodiment of the present invention, which is cut into half along a shaft.
Figure 2:
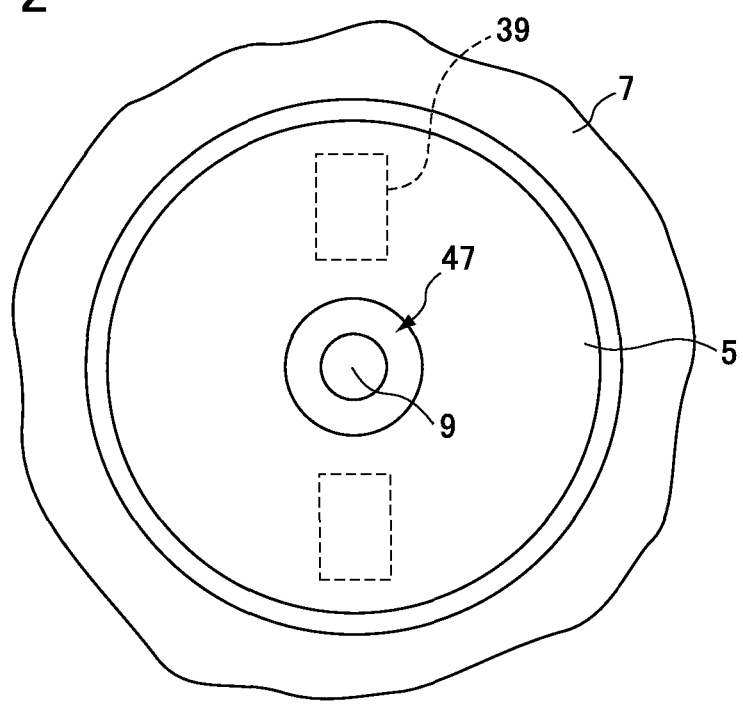
FIG. 2 is a front view of a wheel disk shown in FIG. 1, which is viewed from outside a vehicle.

A first embodiment of the present invention is hereinafter described in detail with reference to FIGS. 1 and 2. An in-wheel motor 1 according to the first embodiment is provided inside a wheel disk 5 of each of four wheels of an electric automobile, and a tire 7 is attached to an outer circumference of the wheel disk 5, thereby electromotively driving each wheel.

The in-wheel motor 1 includes: a stator disk 11 fixed to a shaft 9; a coil body 13 fixed to the stator disk 11; an outer yoke 15 disposed on an outer circumferential side of the coil body 13; a magnet 31 fixed on an inner circumferential face of the outer yoke; an inner yoke 17 disposed on an inner side to the coil body 13; and a brake mechanism 16 disposed on an inner circumferential side of the inner yoke 17.

In the present embodiment, a motor mechanism is configured with the coil body 13, the outer yoke 15, the inner yoke 17, and the magnet 31.

A hollow 19 for wiring is formed inside the shaft 9, and a lead wire 21 for applying an electric current to the coil body 13 passes through the hollow 19 of the shaft 9 and an inner circumferential side space of the outer yoke 15, and is connected to the coil body 13.

The stator disk 11 as coil body support member is discal, in which the shaft 9 is inserted through an aperture formed in the center of the disk to be fixed to the shaft 9 with a key 12.

The coil body 13 has a cylindrical shape, in which, for example, a copper plate is etched to be formed into a linear shape that is then insulated and superimposed as multiple layers. A car body side edge 13a of the coil body 13 is fixed to the outer circumferential portion of the stator disk 11.

The outer yoke 15 has a cylindrical shape, in which a car body side edge 15a of the cylinder is fixed to a cover disk 29, and a car body outer side edge 15b is bent toward the inner circumferential side. The car body side edge 15a of the outer yoke 15 is fixed to an outer circumferential portion 29a of the cover disk 29 with a screw 27, and the cover disk 29 is discal, in which an insertion hole for the shaft 9 is formed in the central portion of the disk, and the shaft 9 is inserted through the insertion hole to be fixed to a bearing 25 with a screw 30.

The car body outer side edge 15b of the outer yoke 15 is fixed on an inner surface of the wheel disk 5 via a spacer 26. Moreover, in the car body outer side edge 15b of the outer yoke 15, a bent inner circumferential side edge thereof is fixed to a wheel-disk side edge 17a of the inner yoke 17.

The magnet 31 is provided to the inner circumferential face of the outer yoke 15, and the magnet 31 is disposed to face the coil body 13. It should be noted that the magnet 31 is polarized to have a plurality of magnetic poles such that the magnetic poles vary in a circumferential direction.

The inner yoke 17 has a cylindrical shape, and is disposed to face the magnet 31 via the coil body 13. An inner circumferential face of the inner yoke 17 is fixed to a support disk 33, and the support disk 33 is fixed to a bearing 35 of the shaft 9. It should be noted that an oil seal 34 is provided to the bearing 35.

The outer yoke 15 and the inner yoke 17 are made of a magnetic material, and form a passage for magnetic flux.

In addition, in the present embodiment, the outer yoke 15, the inner yoke 17 and the stator disk 11 surround the outer circumferential side, the inner circumference and both ends of the coil body 13, and thus cover substantially the entirety of the coil body 13.

Furthermore, the outer yoke 15, the inner yoke 17, the support disk 33 and the cover disk 29 maintain the coil body 13 in a hermetically-sealed state.

The brake mechanism 16 is configured with a doughnut-shaped brake disk 37 and a caliper 39, the brake disk 37 being fixed on the inner circumferential face of the inner yoke 17. The caliper 39 is fixed to a discal caliper support disk 41 with a screw 43, and the caliper support disk 41 is fixed to the shaft 9 with a spline 45.

Moreover, a vent hole 47 is formed in the wheel disk 5 in a position facing a car body outer side edge 9a of the shaft 9, and the outer diameter of the caliper support disk 41 is larger than that of the vent hole 47 of the wheel disk 5.

Next, driving, operation and effect of the in-wheel motor 1 according to the embodiment of the present invention are described.

The in-wheel motor 1 is driven in such a way that an electric current is applied through the lead wire 21 to the coil body 13, and as a result of an electromagnetic force arising against a magnetic field between the magnet 31 and the inner yoke 17, the magnet 31, the outer yoke 15 and the inner yoke 17 rotate as rotors with the coil body 13 serving as a stator, and the wheel disk 5 fixed to the outer yoke 15 rotates around the shaft 9.

When braking is applied to the rotation of the wheel disk 5, the brake disk 37 brakes through friction by operation of the caliper 39.

Since the in-wheel motor 1 according to the first embodiment is a motor of a so-called coreless type without an iron core, it is possible to provide an in-wheel motor that is more lightweight than a motor of a core type having an iron core such as those in the conventional art.

The inner yoke 17 and the outer yoke 15 are integrated, and the coil body 13 is disposed between the outer yoke 15, to which the magnet 31 is fixed, and the inner yoke 17; therefore, the outer yoke 15 and the inner yoke 17 can enhance the flux density of the magnet 31 acting on the coil body 13, and the driving torque can be enhanced.

The brake disk 37 is fixed to the inner yoke 17 that configures the motor mechanism of the in-wheel motor 1, and the brake disk 37 is disposed on the inner circumferential side of the inner yoke; therefore, the brake disk 37 can be disposed inside the inner yoke with a simple structure.

Since the brake disk 37 and the caliper 39 are disposed on the inner circumferential side of the coil body 13, the brake mechanism 16 can be installed inside the motor mechanism, and it is not required to provide space for installing the brake mechanism 16 in addition to the space for installing the motor mechanism, and thus the space for the motor mechanism is not restricted by the brake mechanism 16.

Since the outer yoke 15 and the inner yoke 17 cover the coil body 13, it is possible to achieve waterproofing of the coil body 13, and to prevent foreign matter from adhering thereto.

Furthermore, in the first embodiment, since the outer yoke 15, the inner yoke 17, the support disk 33 and the cover disk 29 maintain the coil body 13 in a hermetically-sealed state, it is possible to enhance the effect of preventing water and foreign matter from adhering to the coil body 13.

By taking in air through the vent hole 47 of the wheel disk 5, it is possible to cool the inside of the in-wheel motor 1. Since the caliper support disk 41 faces the vent hole 47, and the outer diameter thereof is larger than that of the vent hole 47, it is possible to prevent water and foreign matter from invading the inside of the in-wheel motor 1 through the vent hole 47.

Another embodiment of the present invention is hereinafter described, and in the embodiment to be described below, by assigning the same reference numerals to portions that achieve the same operation and effect as the first embodiment, descriptions of such portions are omitted, and points different from the first embodiment are mainly described in the following description.

A second embodiment of the present invention is described with reference to FIG. 3. In the second embodiment, the lead wire 21 described in the first embodiment is connected to a driver 51, and the driver 51 is connected to a power supply 53. The driver 51 is switched in conjunction with brake operation units 57 such as a brake pedal, and when a brake operation is performed, the driver 51 supplies electricity from the coil body 13 to the power supply 53 to cause the in-wheel motor 1 to work as a generator.

According to the second embodiment, when braking is applied to the wheel, the in-wheel motor 1 works as a generator to convert the rotational energy into electricity, and as a result, the in-wheel motor 1 can function as a regenerative brake.

The present invention is not limited to the aforementioned embodiments, and can be modified in various ways without departing from the scope of the present invention. For example, in the first and second embodiments, the vent hole 47 of the wheel disk 5 may not be provided. Moreover, in a case in which the vent hole 47 is provided, the position thereof is not limited to the position facing the car body outer side edge 9a of the shaft 9, and the vent hole 47 may be provided in another position of the wheel disk 5, for example, a position spaced apart from the car body outer side edge 9a of the shaft 9.

Moreover, in the second embodiment, resistance may be connected to the driver 51 to convert the rotational energy into heat for generating heat.

What is claimed is:

1. An in-wheel motor installed inside a wheel disk of a wheel to rotationally drive the wheel around a shaft of the wheel by way of applying a current thereto, the in-wheel motor comprising:
    a coreless cylindrical coil body to which a lead wire for applying a current is connected, the shaft being inserted in an inner circumferential side of the coil body, the coil body supported at one end by a coil body support member that is fixed to the shaft;
    a cylindrical outer yoke that is disposed on an outer circumferential side of the coil body, and is fixed to the wheel disk;
    a magnet that is fixed on an inner circumferential face of the outer yoke, an inner surface of the magnet disposed proximate an outer circumferential face of the coil body;
    a cylindrical inner yoke having an outer circumferential face disposed proximate to an inner circumferential face of the coil body, the inner yoke being fixed to the outer yoke and being rotatable around the shaft;
    a brake disk that is fixed to an inner circumferential side of the inner yoke; and
    a caliper that is provided on the inner circumferential side of the inner yoke to brake the brake disk.

2. The in-wheel motor according to claim 1, wherein the outer yoke and the inner yoke together cover the outer circumferential face, the inner circumferential side face, and one edge of the cylindrical coil body.

3. The in-wheel motor according to claim 1, further comprising a caliper support disk, to which the caliper is mounted, and which is fixed to the shaft,
    wherein a vent hole is formed in the wheel disk in a position facing an end portion of the shaft, the caliper support disk is disposed to face the vent hole of the wheel disk, and an outer diameter of the caliper support disk is larger than that of the vent hole of the wheel disk.

4. The in-wheel motor according to claim 1, further comprising: a driver connected to the lead wire; and a power supply connected to the driver,
    wherein, in a driving mode, the driver supplies electricity from the power supply to the coil body and, in a braking mode, the driver supplies electricity from the coil body to the power supply.

5. An electrically driven vehicle comprising the in-wheel motor according to claim 1.

* * * * *